UNITED STATES PATENT OFFICE.

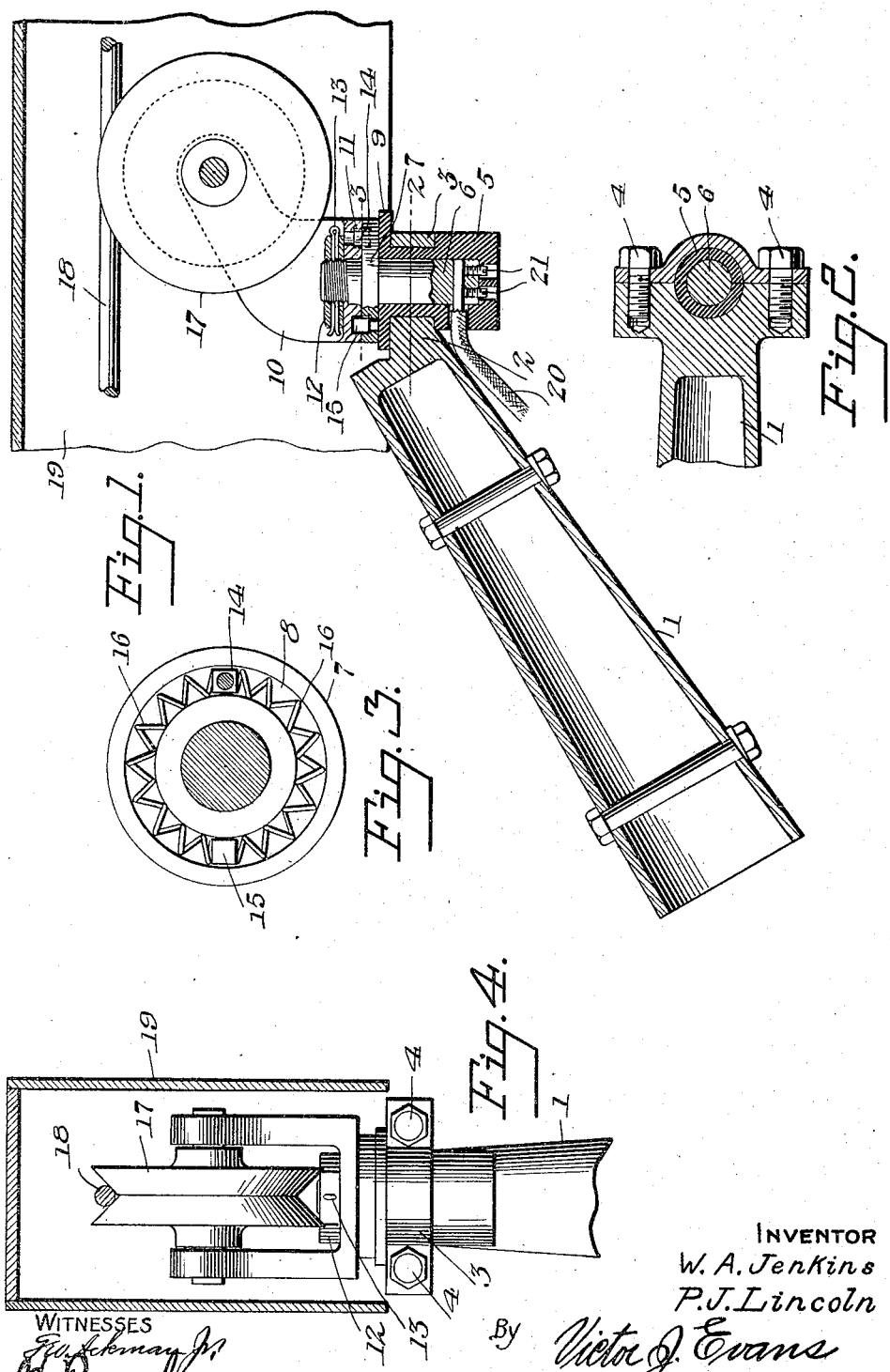

WILLIAM A. JENKINS AND PURD J. LINCOLN, OF BIRMINGHAM, ALABAMA.

SAFETY TROLLEY-HARP.

1,191,005. Specification of Letters Patent. Patented July 11, 1916.

Application filed September 4, 1915. Serial No. 49,078.

*To all whom it may concern:*

Be it known that we, WILLIAM A. JENKINS and PURD J. LINCOLN, citizens of the United States, residing at Birmingham, in the county of Jefferson and State of Alabama, have invented new and useful Improvements in Safety Trolley-Harps, of which the following is a specification.

This invention relates to safety trolley harps and it consists in the novel features hereinafter described and claimed.

An object of the invention is to provide the structure of trolley harps such as are used on trolley motor cars in mines and other places where the electric trolley system is used, and where the trolley wire is in such close proximity to the places where employees work as to render it dangerous of employees coming in contact with the current from the trolley wire.

Another object of the invention is to provide a trolley harp with the current carrying part so insulated as to make it practically impossible for a person on or about the motor to come in contact with any electrically charged portion of the harp. The exposed parts of the said trolley harp which carries the electricity are protected by the ordinary plank shielding used in mines which employ a high voltage of electricity.

In the accompanying drawing: Figure 1 is a vertical longitudinal sectional view of the trolley harp. Fig. 2 is a horizontal sectional view of the same cut on the line 2—2 of Fig. 1. Fig. 3 is a similar view on the line 3—3 of Fig. 1. Fig. 4 is a rear end elevation of the harp showing the planking and the trolley wire in section.

The trolley harp includes a sleeve 1 of conventional form adapted to be applied to the upper end of a trolley pole (not shown) in any suitable manner. A shelf portion 2 is carried at the upper end of the sleeve 1 and a bearing strap 3 is connected with the shelf portion 2 by means of tap bolts 4. Insulating material 5 is held in contact with the shelf portion 2 by means of the bearing strap 3 and the said insulating material is made in the form of a split bushing and is of a nature to withstand weather, moisture and the crushing strains to which it is subjected while the harp is in use. A pin 6 is bound within the insulating material 5 and the said pin is provided in the vicinity of its upper end with an annular disk portion 7 having at its upper side a groove 8, The lower side of the disk portion 7 is insulated from the shelf 2 and the bearing strap 3 by means of an outstanding flange 9 provided at the upper end of the insulating material 5. A yoke member 10 is turnably mounted upon the upper portion of the pin 6 and bears at its intermediate portion against the upper face of the disk 7. The yoke member 10 is provided at the underside of the intermediate portion with an annular groove 11 which is of the same diameter as the groove 8 and is positioned directly above the same. A nut 12 is screw-threaded upon the upper end of the pin 6 and bears at its lower face against the intermediate portion of the yoke 10. The nut 12 is held in position upon the upper end of the pin and against turning movement by means of a cotter pin 13 which passes transversely through the said nut and the upper portion of the said pin 6. An abutment 14 is attached to the intermediate portion of the yoke and lies in the grooves 11 and 8 and an abutment 15 is attached to the disk 7 and also lies in the grooves 11 and 8. The abutment 14 is at the diametrically opposite side of the pin 6 from the abutment 15. The abutment 15 is located in advance of the pin and the abutment 14 behind the rear thereof. Coil springs 16 are located in the grooves 11 and 8 and bear at one end against the abutment 14 and at their other end against the abutment 15. The springs 16 are under tension with a tendency to normally hold the yoke 10 at a predetermined position upon the pin 6 so that the said springs may contract and expand whereby the yoke 10 may have limited turning movement with relation to the pin. A grooved trolley wheel 17 is journaled in the yoke 10 and is adapted to travel along the trolley wire 18 which is housed under the planking 19 in a usual manner.

By reference to Fig. 1 of the drawing, it will be observed that when the trolley wheel 17 is in contact with the wire the yoke 10 is completely housed in the planking 19 and the disk 7 is positioned above the lower edges of the said planking. Current wires 20 pass transversely through the lower portion of the insulating material 5 and are bound in the lower portion of the pin 6 by means of set screws 21 which pass through the lower end of the insulating material 5. Consequently it will be seen that when the harp is in operation the parts which are charged with the electric current are housed under the planking 19 and protected within the insulating material 5 and the possibility of an operative coming in contact with any of the charged parts is prevented.

From the aforegoing description taken in conjunction with the accompanying drawing it will be seen that a trolley harp of simple and durable structure is provided and that the parts are so arranged that the harp may be used safely in mines or other places where the current wire is necessarily positioned in close proximity to those who are compelled to work or operate about the same.

Having described the invention what is claimed is:—

A trolley harp comprising a support, a pin fixed to the support and provided with a disk, said disk having at its upper surface an annular groove, a yoke turnably mounted upon the pin and having its side in close contact with the upper face of the disk, said yoke having an annular groove which registers with the groove in the disk, a wheel journaled in the yoke, spaced abutments fixed in the grooves of the disk and yoke respectively, the abutment which is fixed in the groove of the disk having its end in contact with the bottom wall of the groove in the yoke and the abutment which is fixed in the groove of the yoke having its end in contact with the bottom wall of the groove in the disk, and coil springs housed in both of the grooves and bearing at their ends against the abutments.

In testimony whereof we affix our signatures in presence of two witnesses.

WILLIAM A. JENKINS.
PURD J. LINCOLN.

Witnesses:
HENRY J. MARTIN,
RUBY ELLARD.

Copies of this patent may be obtained for five cents each, by addressing the "Commissioner of Patents, Washington, D. C."